(12) United States Patent
Muñoz De La Torre Alonso et al.

(10) Patent No.: US 12,047,851 B2
(45) Date of Patent: Jul. 23, 2024

(54) COMMUNICATIONS NETWORK ARCHITECTURE

(71) Applicant: Telefonaktiebolaget LM Ericsson (publ), Stockholm (SE)

(72) Inventors: Miguel Angel Muñoz De La Torre Alonso, Madrid (ES); Veronica Sanchez Vega, Madrid (ES); Franco Foresti, Madrid (ES); Julian Espinosa Santos, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 302 days.

(21) Appl. No.: 17/762,271

(22) PCT Filed: Oct. 25, 2019

(86) PCT No.: PCT/EP2019/079262
§ 371 (c)(1),
(2) Date: Mar. 21, 2022

(87) PCT Pub. No.: WO2021/058121
PCT Pub. Date: Apr. 1, 2021

(65) Prior Publication Data
US 2022/0386087 A1 Dec. 1, 2022

(30) Foreign Application Priority Data
Sep. 23, 2019 (EP) .................................... 19382815

(51) Int. Cl.
*H04W 4/02* (2018.01)
*H04L 12/14* (2006.01)
(Continued)

(52) U.S. Cl.
CPC ........... *H04W 4/24* (2013.01); *H04L 12/1407* (2013.01); *H04W 8/20* (2013.01); *H04W 48/16* (2013.01)

(58) Field of Classification Search
CPC ......... H04W 4/24; H04W 8/20; H04W 48/16; H04L 12/1407
See application file for complete search history.

(56) References Cited

U.S. PATENT DOCUMENTS 10,728,836 B2 * 7/2020 Jung ..................... H04W 12/06
2014/0329495 A1 * 11/2014 Park .................. H04W 36/0033
455/406

(Continued)

FOREIGN PATENT DOCUMENTS

EP 3190746 A1 7/2017
WO 2014018425 A2 1/2014

OTHER PUBLICATIONS

3GPP, "3GPP TR 23.787 V0.3.0", 3rd Generation Partnership Project; Technical Specification Group Services and System Aspects; Study on encrypted traffic detection and verification (Release 16), Apr. 2018, 1-38.
3GPP, "3GPP TS 23.203 V15.4.0", 3rd Generation Partnership Project; Technical Specification Group Services and System Aspects; Policy and charging control architecture (Release 15), Sep. 2018, 1-262.

(Continued)

*Primary Examiner* — Moustapha Diaby
(74) *Attorney, Agent, or Firm* — Murphy, Bilak & Homiller, PLLC

(57) ABSTRACT

A Policy Control Function, PCF, for use in a 5G core network, is configured to allow a consumer to retrieve from the PCF subscriber session information and Application Detection and Control rules relating to a subscriber session. Specifically, the PCF is configured to: receive (303) a request from a Session Management Function, SMF, for session management policies applying to the subscriber session; retrieve (305) policy data from a Unified Data Repository, UDR; and, based on the retrieved policy data, (Continued)

generate said Application Detection and Control rules relating to the subscriber session, and send (307) said Application Detection and Control rules to the TDF, thereby allowing the TDF to act as the consumer.

17 Claims, 10 Drawing Sheets

(51) Int. Cl.
*H04W 4/24* (2018.01)
*H04W 8/18* (2009.01)
*H04W 8/20* (2009.01)
*H04W 48/16* (2009.01)

(56) References Cited

U.S. PATENT DOCUMENTS

2019/0207778 A1  7/2019  Qiao et al.
2022/0022097 A1* 1/2022  Jimenez Cordon ............... H04L 12/1407

OTHER PUBLICATIONS

3GPP, "3rd Generation Partnership Project; Technical Specification Group Services and System Aspects; Procedures for the 5G System; Stage 2 (Release 16)", 3GPP TS 23.502 V16.2.0, Sep. 2019, pp. 1-524.

3GPP, "3rd Generation Partnership Project; Technical Specification Group Services and System Aspects; System Architecture for the 5G System; Stage 2 (Release 16)", 3GPP TS 23.501 V16.1.0, Jun. 2019, pp. 1-368.

* cited by examiner

COMMUNICATIONS NETWORK ARCHITECTURE

TECHNICAL FIELD

This relates to a communications network architecture, and in particular to a core network of a 5G cellular network.

BACKGROUND

The Traffic Detection Function, TDF, was introduced in the 3rd Generation Partnership Project, 3GPP, Release 11. The TDF is a functional entity that performs application detection and control through different enforcement actions (for example gating, QoS, and reporting of a detected application and its service data flow description) on a per application basis. The Sd reference point was defined between the TDF and the Policy and Charging Rules Function, PCRF, allowing the PCRF to send subscriber session data and Application Detection and Control, ADC, rules to the TDF, and optionally allowing application detection and reporting from the TDF to the PCRF.

In 3GPP Release 14, as part of Control User Plane Separation, the TDF was split into a control plane function (TDF-C) and a user plane function (TDF-U), and a new Sxc reference point was defined between them.

However, in the 5th Generation, 5G, network architecture, defined in 3GPP Release 15, the TDF functional entity does not exist, and therefore neither does the Sd reference point to the PCRF. In such a network, therefore, the TDF is a network function that is deployed in the N6 (SGi) reference point and is out of 3GPP scope. The problem with this is that, in order to perform its tasks, the TDF will need information from the Policy Control Function, PCF, specifically subscriber session information and ADC rules.

SUMMARY

According to an aspect of the present disclosure, there is provided a Policy Control Function, PCF, for use in a 5G core network, wherein the PCF is configured to allow a consumer to retrieve from the PCF subscriber session information and Application Detection and Control rules relating to a subscriber session.

The PCF may be configured to allow a Traffic Detection Function, TDF, to act as said consumer.
The PCF may be configured to:
receive a request from a Session Management Function, SMF, for session management policies applying to the subscriber session;
retrieve policy data from a Unified Data Repository, UDR; and
based on the retrieved policy data, generate said Application Detection and Control rules relating to the subscriber session, and send said Application Detection and Control rules to the TDF.
The PCF may be further configured to:
based on the retrieved policy data, generate Policy Charging and Control rules relating to the subscriber session; and
send said Policy Charging and Control rules to the SMF.
The retrieved policy data may indicate that a TDF is required for the subscriber session.
The PCF may be further configured to receive from the UDR information identifying the TDF. The information identifying the TDF may comprise an IP address of the TDF.

According to an aspect of the present disclosure, there is provided a Traffic Detection Function, TDF, for use with a 5G core network, configured to:
receive from a Policy Control Function, PCF, subscriber session information and Application Detection and Control rules relating to a subscriber session.
The TDF may be further configured to:
create a subscriber session; and
store subscriber session information and Application Detection and Control rules relating to said subscriber session.
The TDF may be further configured to:
confirm to the PCF that the subscriber session has been created.
The TDF may be further configured to:
detect traffic in said subscriber session, and to apply enforcement actions based on said Application Detection and Control rules relating to said subscriber session.
The TDF may be further configured to support an Event Exposure service.

According to an aspect of the present disclosure, there is provided a User Plane Function, UPF, for use in a 5G core network, configured to send Policy Control Function, PCF, identifier information to a consumer, such that the consumer is able to retrieve from the PCF subscriber session information and Application Detection and Control rules relating to a subscriber session.

The consumer may be a Traffic Detection Function, TDF.
The PCF identifier information may comprise an IP address of the PCF.

According to an aspect of the present disclosure, there is provided a Unified Data Repository, UDR, for use in a 5G core network, wherein the UDR is configured to:
receive a query request from a Policy Control Function, PCF, relating to a subscriber session;
determine whether a Traffic Detection Function, TDF, is required for the subscriber session; and
if it is determined that a TDF is required for the subscriber session, indicate to the PCF that a TDF is required.
The UDR may be further configured to provide to the PCF information identifying the TDF. The information identifying the TDF may comprise an IP address of the TDF.

According to an aspect of the present disclosure, there is provided a Policy Control Function, PCF, for use in a 5G core network, configured to:
receive a request from a Session Management Function, SMF, for session management policies applying to a subscriber session;
retrieve policy data from a Unified Data Repository, UDR;
based on the retrieved policy data, generate Policy Charging and Control rules relating to the subscriber session; and
send said Policy Charging and Control rules to the SMF.
The retrieved policy data may indicate that a Traffic Detection Function User Plane, TDF-U, is required for the subscriber session.
The PCF may be further configured to receive from the UDR information identifying the TDF-U. The information identifying the TDF-U may comprise an IP address of the TDF-U.

According to an aspect of the present disclosure, there is provided a Traffic Detection Function User Plane, TDF-U, for use with a 5G core network, configured to receive from a Session Management Function, SMF, subscriber session information and rules relating to a subscriber session.

The TDF-U may be further configured to:
create a subscriber session; and
store subscriber session information and rules relating to said subscriber session.

The TDF-U may be further configured to:
confirm to the SMF that the subscriber session has been created.

The TDF-U may be further configured to:
detect traffic in said subscriber session, and to apply enforcement actions based on said rules relating to said subscriber session.

The TDF-U may be further configured to support an Event Exposure service.

According to an aspect of the present disclosure, there is provided a Session Management Function, SMF, for use in a 5G core network, configured to:
send a request for session management policies relating to a subscriber session to a Policy Control Function, PCF;
receive from the PCF Policy Charging and Control rules relating to the subscriber session, wherein the Policy Charging and Control rules indicate that a Traffic Detection Function User Plane, TDF-U, is required for the subscriber session.

The SMF may be further configured to select a TDF-U for the subscriber session, based on the received Policy Charging and Control rules.

The SMF may be further configured to select a User Plane Function, UPF, for the subscriber session, based on the received Policy Charging and Control rules.

The SMF may be further configured to:
send subscriber session information and rules to the selected TDF-U.

The SMF may be further configured to receive from the selected TDF-U confirmation that the subscriber session has been created.

According to an aspect of the present disclosure, there is provided a Unified Data Repository, UDR, for use in a 5G core network, wherein the UDR is configured to:
receive a query request from a Policy Control Function, PCF, relating to a subscriber session;
determine whether a Traffic Detection Function User Plane, TDF-U, is required for the subscriber session; and
if it is determined that a TDF-U is required for the subscriber session, indicate to the PCF that a TDF-U is required.

The UDR may be further configured to provide to the PCF information identifying the TDF-U. The information identifying the TDF-U may comprise an IP address of the TDF-U.

This has the advantage that it allows a Traffic Detection Function (or Traffic Detection Function User plane) to be integrated with the core network, so that it can receive the network data that it requires to perform its intended functions.

In certain embodiments, the Traffic Detection Function (or Traffic Detection Function User plane) support an Event Exposure service, and an analytics entity (namely the NWDAF in 5G) can act as the main consumer for that service. This will allow the network operator to receive events directly from the TDF (or TDF-U).

DETAILED DESCRIPTION

Figure 1:
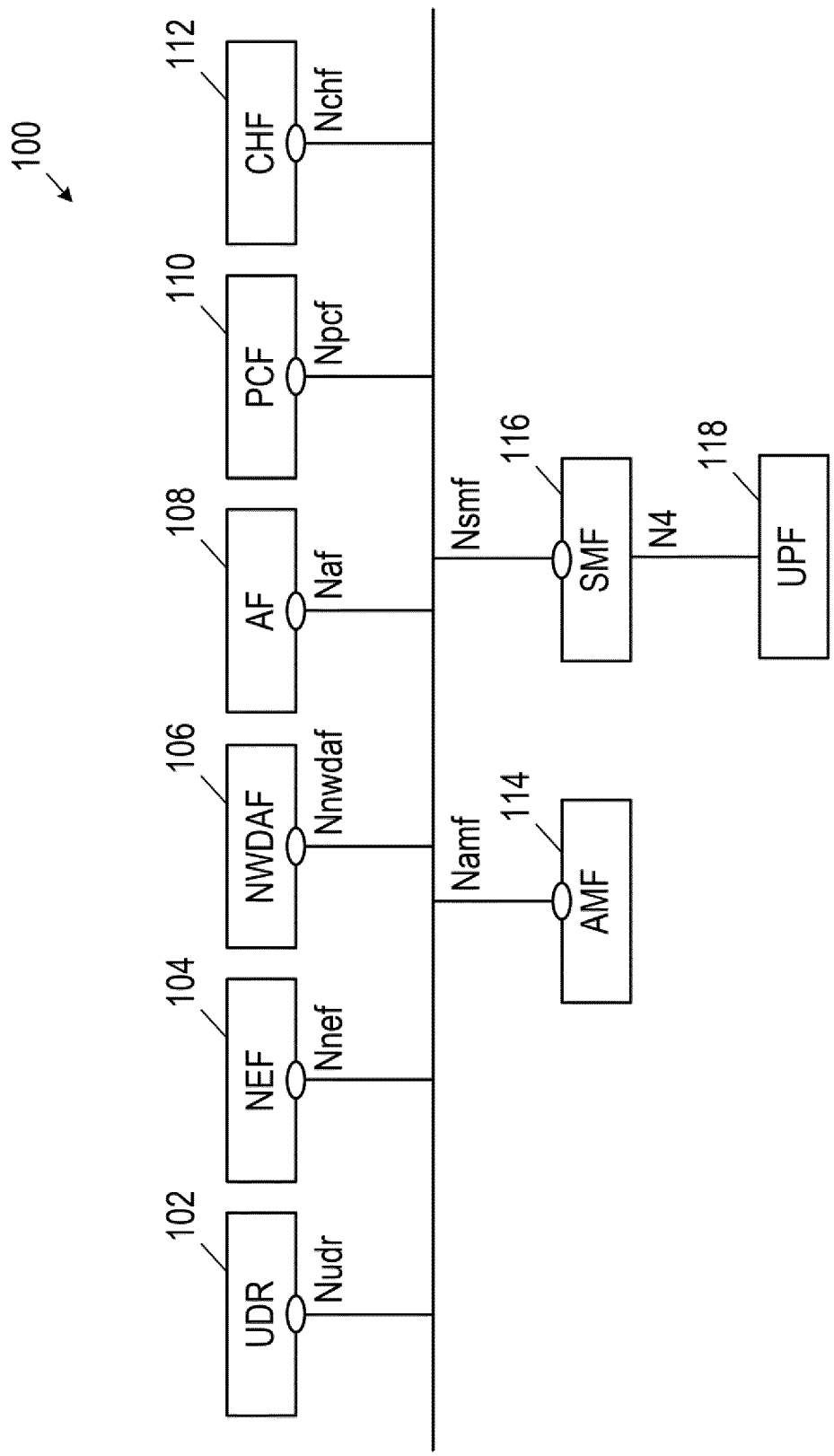
FIG. 1 illustrates a 5G core network architecture.

FIG. 1 shows a 5th Generation core (5GC) network architecture 100.

Specifically, FIG. 1 shows the relevant parts of the network architecture 100 comprising: a Unified Data Repository (UDR) 102, with a service-based interface Nudr; a Network Exposure Function (NEF) 104, with a service-based interface Nnef; a Network Data Analytics Function (NWDAF) 106, with a service-based interface Nnwdaf; an Application Function (AF) 108, with a service-based interface Naf; a Policy Control Function (PCF) 110, with a service-based interface Npcf; a Charging Function (CF) 112, with a service-based interface Nchf; an Access and Mobility Management Function (AMF) 114, with a service-based interface Namf; a Session Management Function (SMF) 116, with a service-based interface Nsmf; and a User Plane Function (UPF) 118, with an N4 reference point between the UPF and the SMF.

The most relevant architectural aspects for present purposes are the PCF (Policy Control Function), SMF (Session Management Function), and UPF (User Plane Function).

The Policy Control function (PCF) supports different functionalities, for example a unified policy framework to govern network behaviour, provides policy rules to Control Plane function(s) to enforce them, and accesses subscription information relevant for policy decisions in a Unified Data Repository (UDR).

The Session Management function (SMF) supports different functionalities, for example Session Establishment, modify and release, and policy related functionalities such as termination of interfaces towards Policy control functions, Charging data collection, support of charging interfaces and control and coordination of charging data collection at the UPF.

The User Plane function (UPF) supports handling of user plane traffic, including packet inspection, packet routing and forwarding (including traffic steering), traffic usage reporting, and Quality of Service (QoS) handling for the user plane (for example Uplink and/or Downlink rate enforcement).

Figure 2:
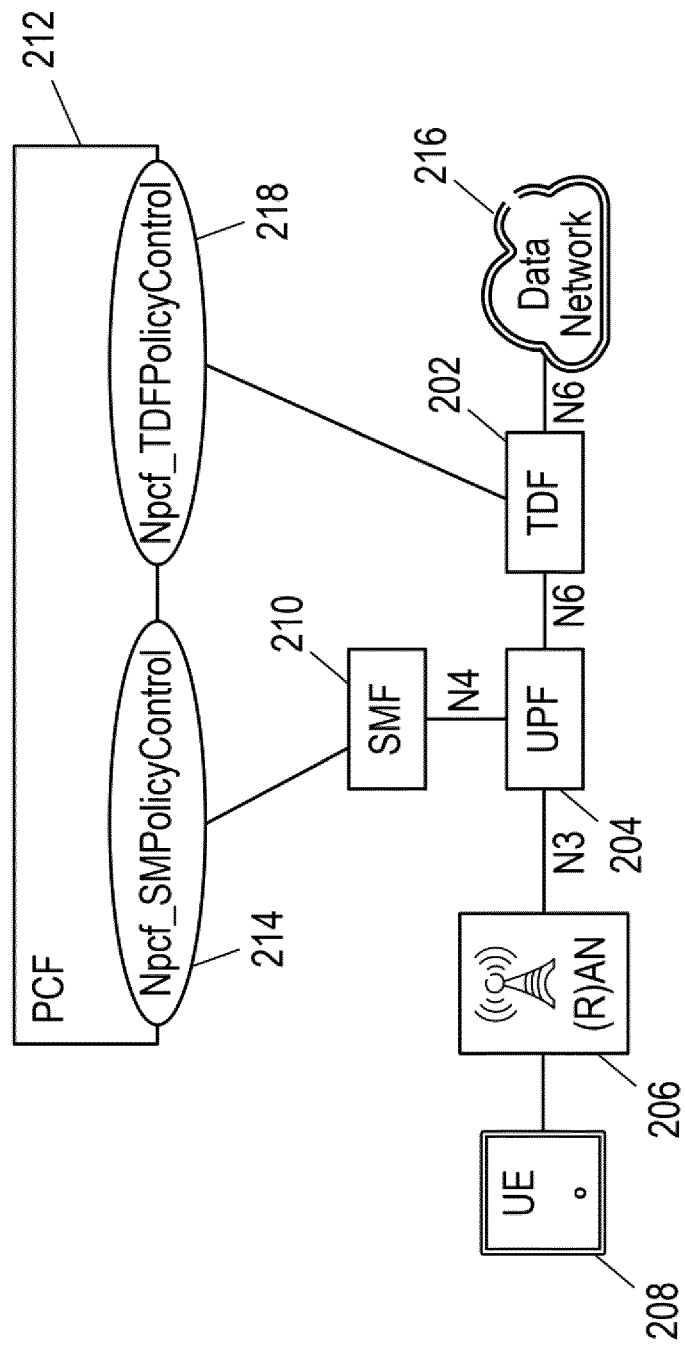
FIG. 2 illustrates a first architecture in accordance with an aspect of the invention.

FIG. 2 illustrates a development of the architecture shown in FIG. 1.

Specifically, FIG. 2 shows how a Traffic Detection Function (TDF) 202 can be integrated into the 5GC architecture.

The architecture shown in FIG. 2 includes elements that are similar to those shown in FIG. 1, except as described in more detail below. Thus, the UPF 204 is connected over the N3 reference point to the Radio Access Network (RAN) 206, which is provided to allow devices such as the User Equipment (UE) 208 to connect to the network.

The UPF 204 is connected to the SMF 210 over the N4 reference point. The PCF 212 is provided with a service 214, identified as Npcf_SMPolicyControl.

The TDF 202 is connected over an N6 reference point to the UPF 204, and is also connected over an N6 reference point to a data network 216.

In accordance with this disclosure, the PCF 214 is extended with a service 218, identified as Npcf_TDFPolicyControl, which is provided to allow a consumer to retrieve from the PCF both subscriber session information and Application Detection and Control (ADC) rules.

Further, the TDF 202 is allowed to be the consumer for the PCF service 218 mentioned above. In other embodiments, other consumers are possible, for example any Service Function (SF) in the SGi Local Area Network (SGi-LAN).

Allowing the TDF 202 to retrieve subscriber session information and ADC rules from the PCF means that it can be integrated in the 5G architecture and can receive the network data that it needs to perform its tasks.

Figure 3A:
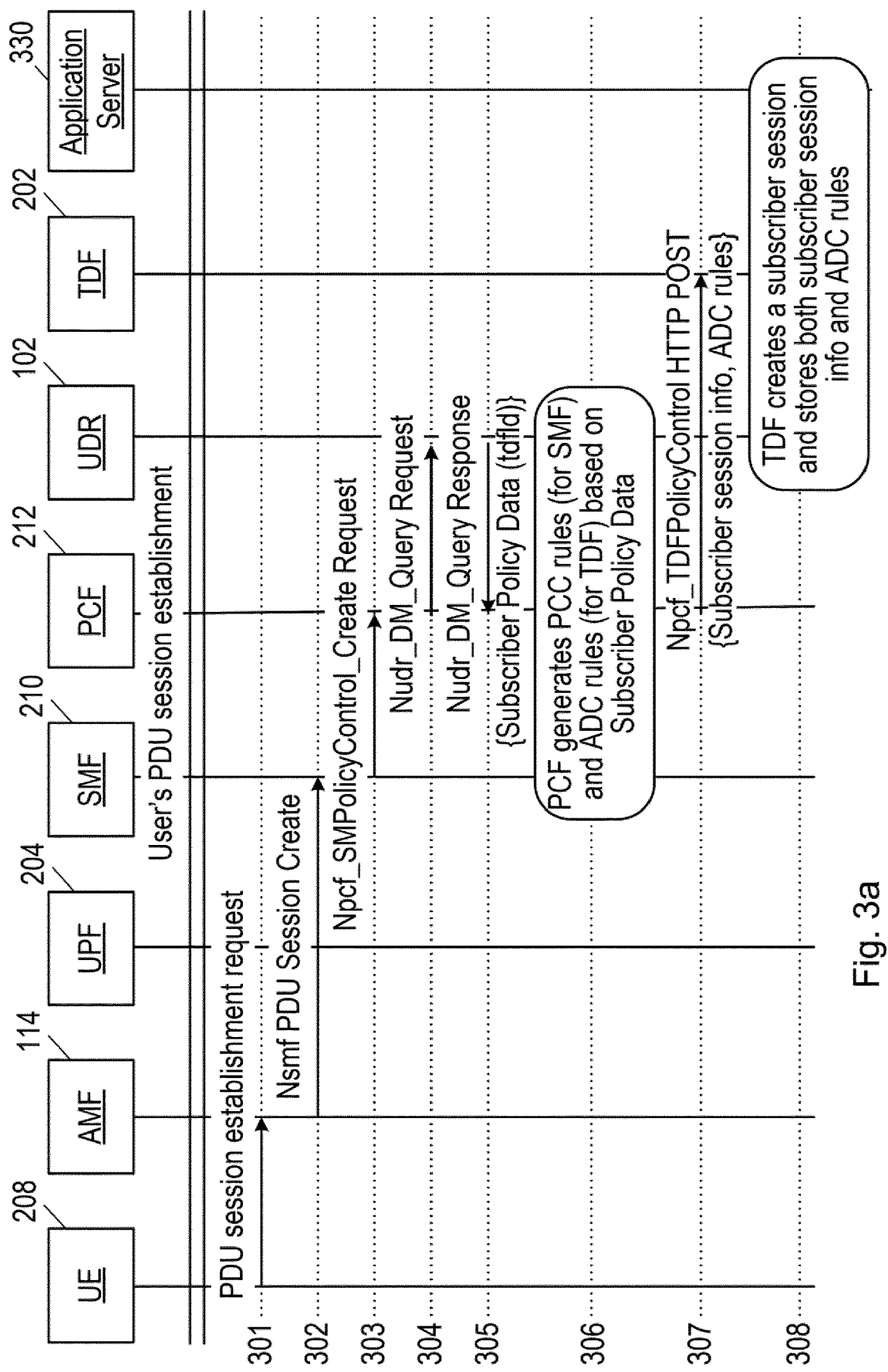
FIGS. 3a and 3b together are a signalling diagram illustrating the operation of the architecture shown in FIG. 2.
Figure 3B:
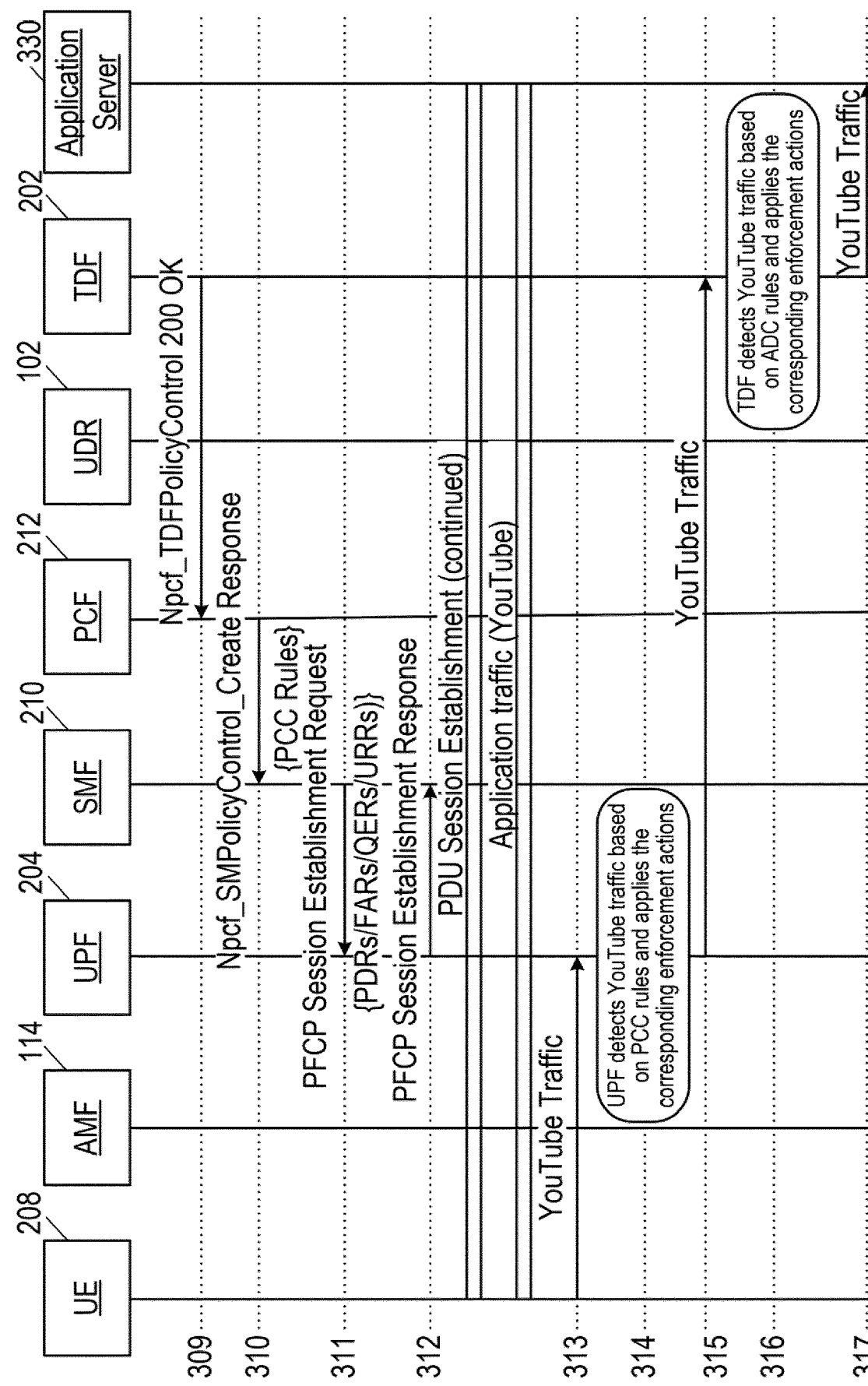

FIG. 3, made up of FIG. 3a and FIG. 3b, is a signalling diagram, illustrating the messages that flow between network functions in operation of the Npcf_TDFPolicyControl service, where the network functions have been described with reference to FIG. 1 or FIG. 2.

FIG. 3 and illustrates the case where the TDF 202 receives the subscriber session information and the ADC rules from the PCF 212 that is handling the subscriber's Protocol Data Unit (PDU) session. By way of illustration only, FIG. 3 shows an example use case, where the TDF 202 is used in order to run video optimization based on the Radio Access Technology (RAT) type for YouTube™ application traffic. In this illustrated example, the PCF 212 discovers the TDF 202 when the subscriber's PDU session is established. In an alternative embodiment, the TDF 202 could discover the PCF 212, by the UPF 204 sending the PCF identifier (for example the IP address of the PCF) to the TDF.

In steps 301 and 302, the UE 208 triggers the PDU session establishment, by sending a PDU Session Establishment Request to the AMF 114, and by the AMF selecting an SMF 210 and triggering the Nsmf PDU Session Create message. It will be appreciated that the sequence diagram in FIG. 3 does not include all of the signalling messages that are involved in the PDU Session Establishment procedure, but these will be understood by the skilled reader.

In step 303, the SMF 210 triggers an Npcf_SMPolicyControl_Create Request message to the PCF 212 to retrieve Session Management (SM) policies for the user PDU session.

In step 304, the PCF 212 triggers an Nudr_DM_Query Request message to the UDR 102 to retrieve the policy data for this user PDU session.

In step 305, the UDR 102 answers the PCF with an Nudr_DM_Query Response message including the Subscriber Policy Data. In particular, the UDR indicates to the PCF that a TDF is required for the subscriber's PDU session, and in this particular embodiment it does this by means of returning information identifying the TDF, for example the IP address of the TDF 202.

In step 306, the PCF 212 generates Policy Charging and Control (PCC) rules for the SMF 210, and Application Detection and Control (ADC) rules for the TDF 202, based on the Subscriber Policy Data.

In step 307, based on the above, the PCF 212 triggers an Npcf_TDFPolicyControl HTTP POST message to the target TDF 202, which it determines from the information identifying the TDF 202, for example the IP address of the TDF as described above.

The body of the HTTP POST message includes subscriber session information and the ADC rules generated by the PCF.

Thus, in this illustrated embodiment, the PCF 212 discovers the TDF 202. In an alternative embodiment, the TDF discovers the PCF. This is achieved by the UPF 204 sending the PCF identifier (for example the IP address of the PCF 212) to the TDF 202. In this case, the UPF determines which Service Functions (SFs) are in the chain indicated by the trafficSteeringPolicyIdentifier (in this case a TDF), and gives instructions to the TDF so that it can subscribe to the new PCF Npcf_TDFPolicyControl service 218 shown in FIG. 2. In order to do so, the UPF triggers an Naf HTTP POST message to the TDF, including in the body the PCF identifier and the information that is required to allow the TDF to identify the subscriber session, for example the external user identity (externalId or Global Public Subscription Identifier, GPSI) and/or the IP address of the UE.

Returning to the embodiment shown in FIG. 3, in step 308 the TDF creates a subscriber session and stores both the subscriber session information and the ADC rules. Then, in step 309, the TDF answers back to the PCF with a Npcf_TDFPolicyControl 200 OK successful response.

In step 310, the PCF triggers an Npcf_SMPolicyControl_Create Response message to the SMF 210, including the PCC rules to be applied for the subscriber's PDU session.

In step 311, the SMF selects the UPF 204, and triggers a Packet Forwarding Control Protocol (PFCP) Session Establishment Request message to the UPF 204, including the corresponding rules, for example the Packet Detection Rules (PDRs), Forwarding Action Rules (FARs), QoS Enhancement Rules (QERs) and Usage Reporting Rules (URRs).

In step 312, the UPF stores the PDRs/FARs/QERs/URRs, and answers back to the SMF with a PFCP Session Establishment Response message.

In step 313, by way of example, the user opens the YouTube™ application.

In step 314, the UPF uses the PCC rules to detect YouTube™ traffic and to apply the corresponding enforcement actions. Specifically, detection is based on matching the incoming packets with a PDR with Packet Detection Information (PDI) of type application with appId=YouTube, and having as an enforcement action a steering rule to forward this traffic towards the N6 interface (for example according to a FAR which includes as Forwarding Action the N6 interface, or alternatively through a trafficSteeringPolicyIdentifier pointing to the TDF). Thus, in step 315, the traffic is directed from the UPF 204 to the TDF 202.

In step 316, the TDF uses the ADC rules received in step 307 above to detect YouTube™ traffic and to apply the corresponding enforcement actions, for example to apply video optimization for YouTube™ traffic based on the Subscriber Session information received in step 307 above (for example the RAT-Type, location, etc).

In step 317, the TDF then directs the YouTube™ traffic to the relevant application server 330.

Thus, the Policy Control Function (PCF) is extended with a service (which in this example is given the name Npcf_TDFPolicyControl), which allows a consumer, for example the Traffic Detection Function (TDF), to retrieve from the PCF both the subscriber session parameters and the ADC rules.

In the illustrated embodiment, discovery of the PCF (that is, how the consumer, such as the TDF, knows which PCF handles the user's PDU session), takes place by the UPF sending the PCF identifier (for example the IP address of the PCF) to the consumer. An alternative mechanism is for the PCF to discover the consumer when the user's PDU session is established.

Figure 4:
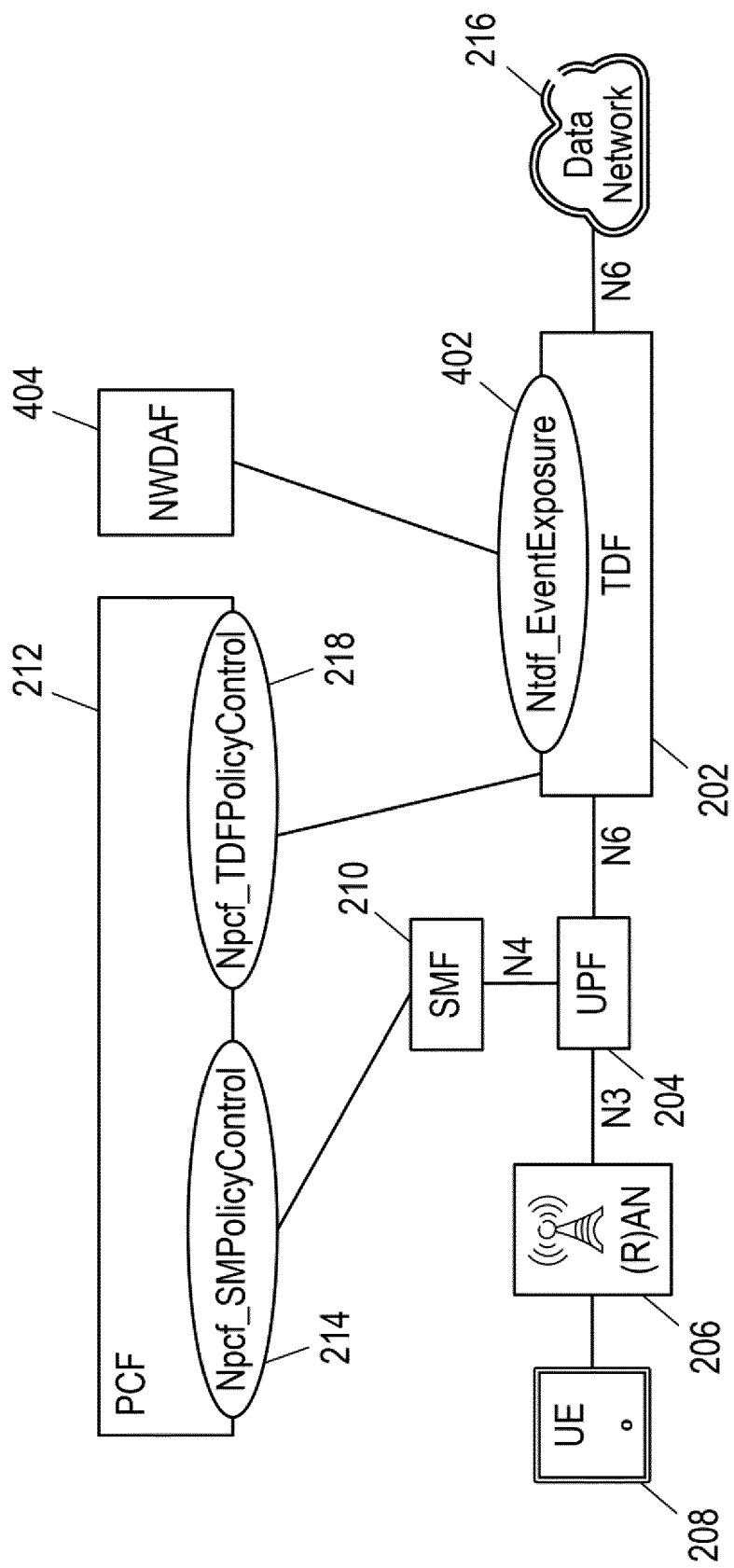
FIG. 4 illustrates a development of the architecture shown in FIG. 2.

FIG. 4 illustrates a further development of the architecture shown in FIG. 2. Specifically, the architecture shown in FIG. 4 has several features in common with FIG. 2, and those features are indicated by the same reference numerals. The architecture shown in FIG. 4 is therefore capable of operating in the manner described in FIG. 3.

In addition, the TDF 202 provides support for an Event Exposure service. Thus, as shown in FIG. 4, the TDF 202 supports an Event Exposure service, Ntdf_EventExposure, 402, and the 5G analytics entity, the Network Data Analytics Function (NWDAF) 404 acts as the main consumer for that service. This allows the network operator to receive events directly from the TDF.

It has also been proposed, as part of Control User Plane Separation, that the TDF be split into a control plane function (TDF-C) and a user plane function (TDF-U), with a new Sxc reference point was defined between them.

The present disclosure also describes a mechanism to allows the TDF functionality to be integrated into the 5G architecture and to receive the network data needed to perform the TDF tasks.

Figure 5:
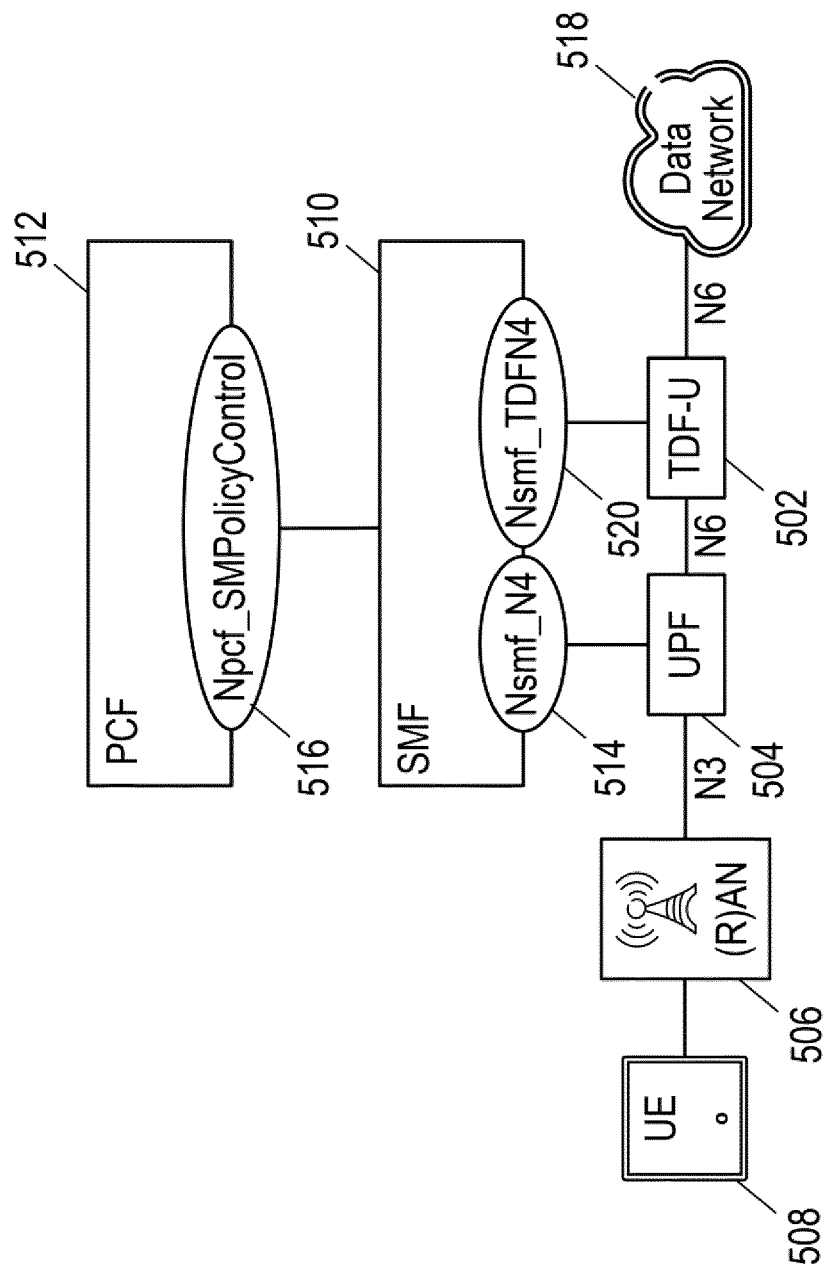
FIG. 5 illustrates a second architecture in accordance with an aspect of the invention.

Thus, FIG. 5 illustrates a development of the architecture shown in FIG. 1.

Specifically, FIG. 5 shows how the TDF functionality can be integrated into the 5GC architecture. The architecture shown in FIG. 5 includes elements that are similar to those shown in FIG. 1, except as described in more detail below.

In this example, the functionality of the TDF is split into a user plane function (i.e. the Traffic Detection Function User plane, or TDF-U) 502, and a control plane function (i.e. the Traffic Detection Function Control plane, or TDF-C), with the latter function being included in the SMF 510.

As before, the UPF 504 is connected over the N3 reference point to the Radio Access Network (RAN) 506, which is provided to allow devices such as the User Equipment (UE) 508 to connect to the network.

The UPF 504 is connected to the SMF 510 over the N4 reference point, and the SMF 510 is connected to the PCF 512. More specifically, the SMF 510 is provided with a service 514, identified as Nsmf_N4, to which the UPF 504 connects, and the PCF 512 is provided with a service 516, identified as Npcf_SMPolicyControl, to which the SMF 510 connects.

The TDF-U 502 is connected over an N6 reference point to the UPF 504, and is also connected over an N6 reference point to a data network 518.

In accordance with this disclosure, the SMF 510 is extended with a service 520, identified as Nsmf_TDFN4, in order to allow a consumer to retrieve from the SMF both subscriber session information and the rules to be applied. Further, the TDF-U 502 is allowed to be the consumer for the SMF service 520 mentioned above. In other embodiments, other consumers are possible, for example any Service Function (SF) in the SGi Local Area Network (SGi-LAN).

Allowing the TDF-U 502 to retrieve subscriber session information and ADC rules from the SMF means that it can be integrated in the 5G architecture and can receive the network data that it needs to perform its tasks.

Figure 6A:
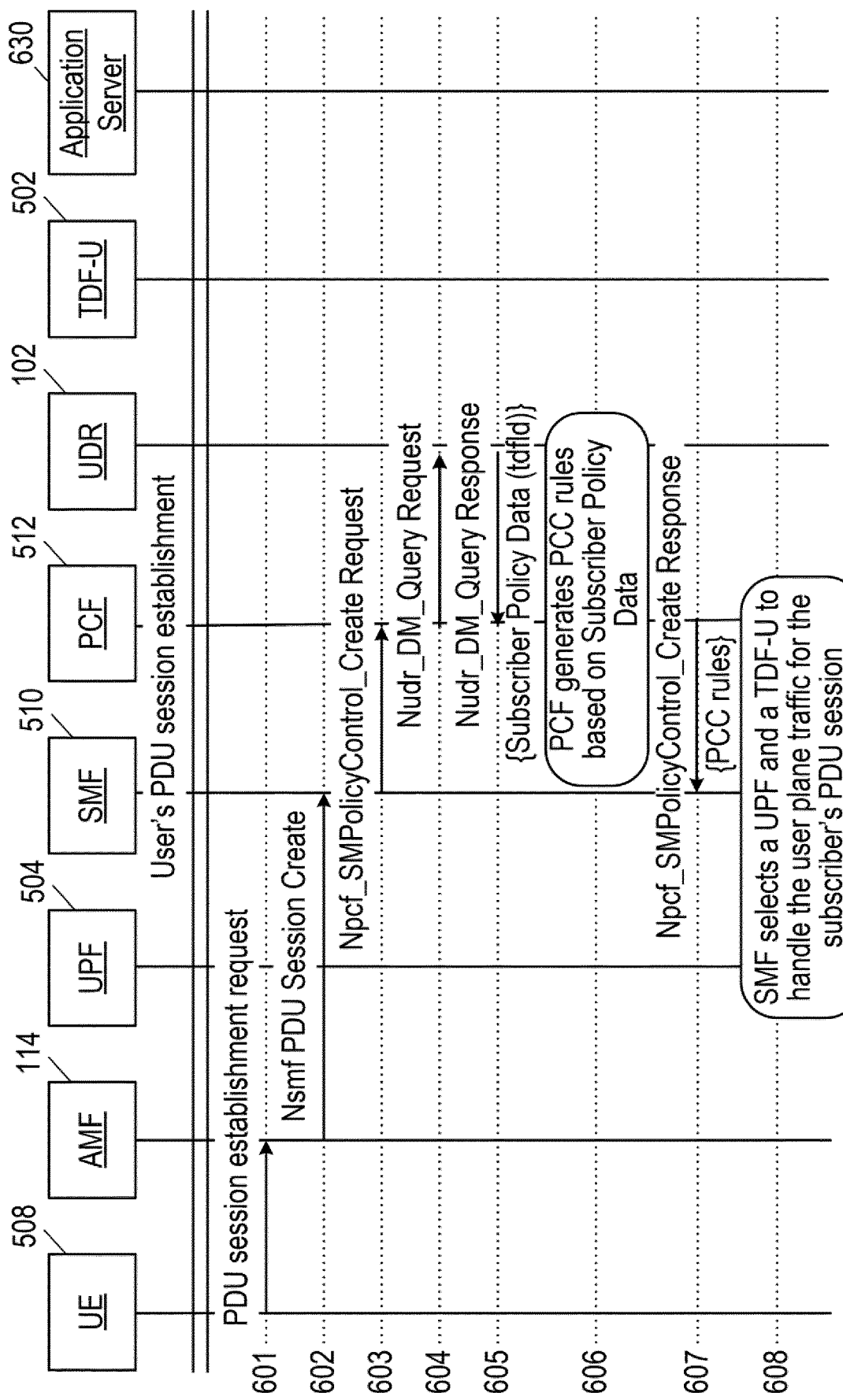
FIGS. 6a and 6b together are a signalling diagram illustrating the operation of the architecture shown in FIG. 5.
Figure 6B:
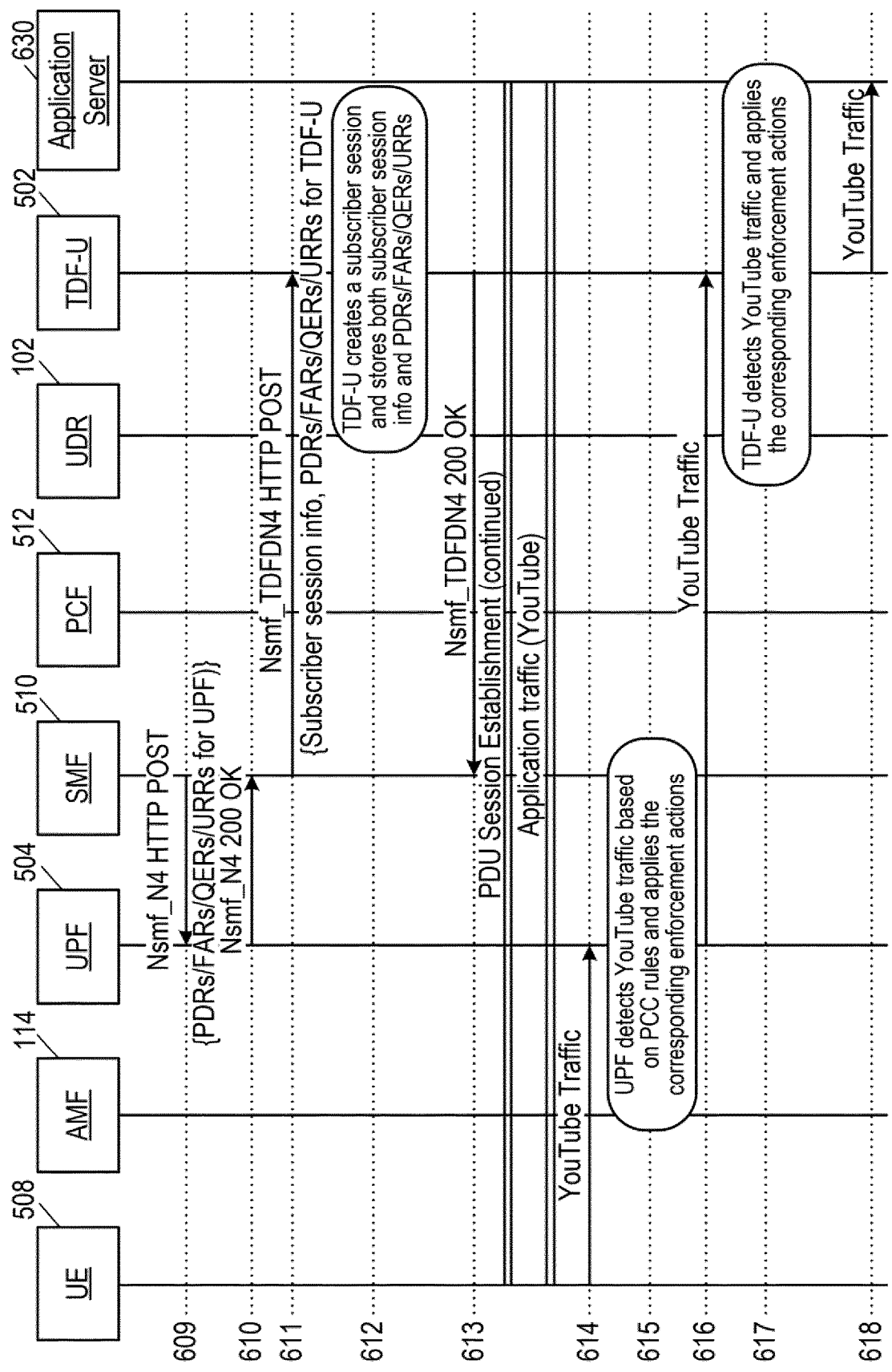

FIG. 6, made up of FIG. 6a and FIG. 6b, is a signalling diagram, illustrating the messages that flow between network functions in operation of the Nsmf_TDFN4 service, where the network functions have been described with reference to FIG. 1 or FIG. 5.

FIG. 6 illustrates the case where the TDF-U 502 receives the subscriber session information and the detection and enforcement rules directly from the SMF 510 that is handling the subscriber's Protocol Data Unit (PDU) session. This implies that the SMF 510 includes the TDF-C functionality.

By way of illustration only, FIG. 6 shows an example use case, where the TDF-U 502 is used in order to run video optimization based on the Radio Access Technology (RAT) type for YouTube™ application traffic. In this illustrated example, the SMF 510 discovers the TDF-U 502 when the subscriber's PDU session is established.

In steps 601 and 602, the UE 208 triggers the PDU session establishment, by sending a PDU Session Establishment Request to the AMF 114, and by the AMF selecting an SMF 510 and triggering the Nsmf PDU Session Create message. It will be appreciated that the sequence diagram in FIG. 3 does not include all of the signalling messages that are involved in the PDU Session Establishment procedure, but these will be understood by the skilled reader.

In step 603, the SMF 510 triggers an Npcf_SMPolicyControl_Create Request message to the PCF 512 to retrieve Session Management (SM) policies for the user PDU session.

In step 604, the PCF 512 triggers an Nudr_DM_Query Request message to the UDR 102 to retrieve the policy data for this user PDU session.

In step 605, the UDR 102 answers the PCF with an Nudr_DM_Query Response message including the Subscriber Policy Data. In particular, the UDR indicates to the PCF that a TDF-U is required for the subscriber's PDU session, and in this particular embodiment it does this by means of returning information identifying the TDF, for example the IP address of the TDF-U 502.

In step 606, the PCF 512 generates Policy Charging and Control (PCC) rules, based on the Subscriber Policy Data. The PCC rules indicate that a TDF-U is required for the subscriber's PDU session, for example by means of including information identifying a TDF-U (that is, a tdfId), for example the IP address of the TDF-U.

In step 607, the PCF triggers an Npcf_SMPolicyControl_Create Response message to the SMF 510, with the message including the PCC rules to be applied for the subscriber's PDU session.

In step 608, based on the PCC rules received, the SMF 510 selects a UPF 504 (as described in the current 3GPP Rel15 procedures) and also selects a TDF-U to handle the user plane traffic for the subscriber's PDU session.

In step 609, the SMF 510 triggers an Nsmf_N4 HTTP POST message towards the selected UPF 504 by including the corresponding rules, for example the Packet Detection Rules (PDRs), Forwarding Action Rules (FARs), QoS Enhancement Rules (QERs) and Usage Reporting Rules (URRs). For example, the N4 reference point between the UPF and the SMF using the PFCP protocol may be replaced by a service-based interface, for example called Nsmf_N4.

In step 610, the UPF 504 stores the PDRs/FARs/QERs/URRs and answers back to the SMF 510 with a Nsmf_N4 HTTP 200 OK successful response.

In step 611, the SMF triggers an Nsmf_TDFN4 HTTP POST message to the target TDF-U (determined by the identifying information tdfId, which could be just the IP address of the TDF-U). The body of the HTTP POST message includes both the subscriber session information and the corresponding PDRs/FARs/QERs/URRs.

In step 612, the TDF-U 502 creates a subscriber session and stores the subscriber session information and the corresponding PDRs/FARs/QERs/URRs.

In step 613, the TDF-U answers back to the SMF 510 with a Nsmf_TDFN4 200 OK successful response.

In step 614, by way of example, the user opens the YouTube™ application.

In step 615, the UPF 504 uses the received rules to detect YouTube™ traffic and to apply the corresponding enforcement actions. Specifically, detection is based on matching the incoming packets with a PDR with Packet Detection Information (PDI) of type application with appId=YouTube, and having as an enforcement action a steering rule to forward this traffic towards the N6 interface (for example according to a FAR which includes as Forwarding Action the N6 interface, or alternatively through a trafficSteeringPolicyIdentifier pointing to the TDF). Thus, in step 616, the traffic is directed from the UPF 504 to the TDF-U 502.

In step 617, the TDF-U uses the PDRs/FARs/QERs/URRs received in step 611 above to detect YouTube™ traffic and to apply the corresponding enforcement actions, for example to apply video optimization for YouTube™ traffic based on the Subscriber Session information received in step 6117 above (for example the RAT-Type, location, etc).

In step 618, the TDF-U then directs the YouTube™ traffic to the relevant application server 630.

Thus, in the TDF-U scenario, it is disclosed that the existing TDF-C functionality be integrated into the SMF and that the SMF be extended with a new service (called Nsmf_TDFN4 herein) to allow the TDF-U to retrieve from the SMF both subscriber session parameters and TDF-U rules.

In order to facilitate SMF discovery (that is, how the consumer, for example the TDF-U, knows which SMF is handling the user's PDU session), a mechanism is described where the SMF allocates the TDF-U instance when the user's PDU session is established.

Figure 7:
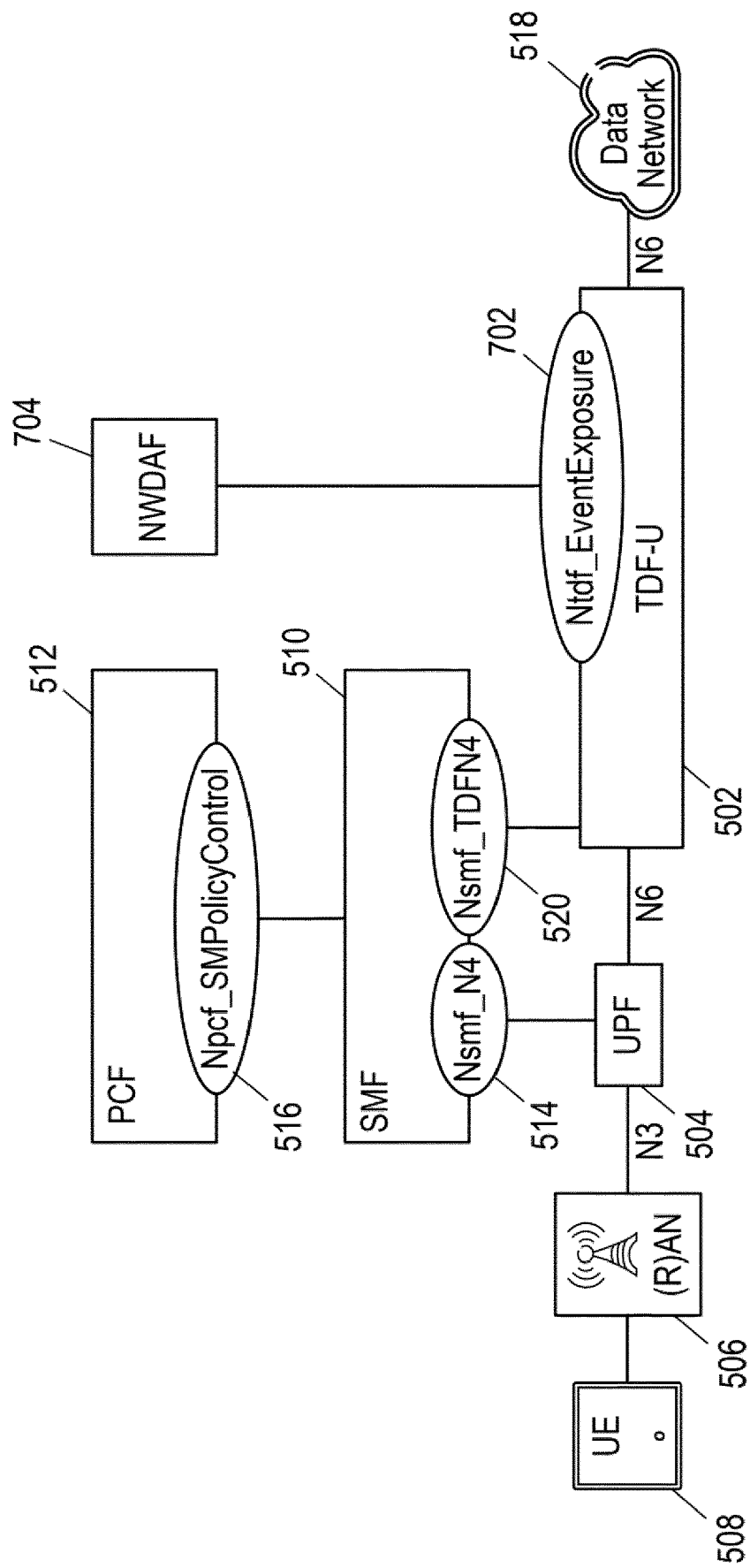
FIG. 7 illustrates a development of the architecture shown in FIG. 5.

FIG. 7 illustrates a further development of the architecture shown in FIG. 7. Specifically, the architecture shown in FIG. 7 has several features in common with FIG. 5, and those features are indicated by the same reference numerals. The architecture shown in FIG. 7 is therefore capable of operating in the manner described in FIG. 6.

In addition, the TDF-U 502 provides support for an Event Exposure service. Thus, as shown in FIG. 7, the TDF-U 502 supports an Event Exposure service, Ntdf_EventExposure, 702, and the 5G analytics entity, the Network Data Analytics Function (NWDAF) 704 acts as the main consumer for that service. This allows the network operator to receive events directly from the TDF.

Figure 8:
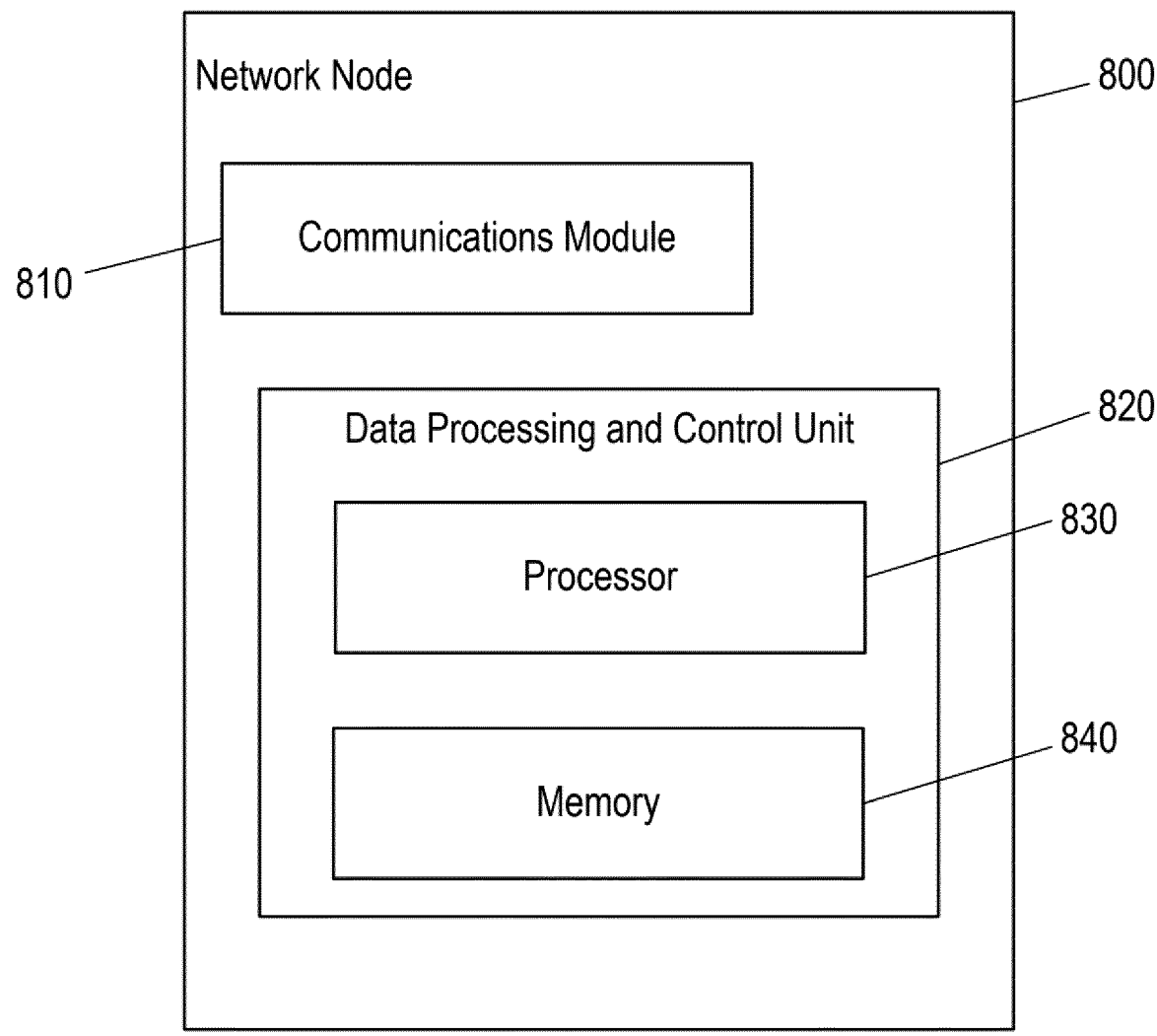
FIG. 8 illustrates a core network node in which the functionality described herein may be implemented.

FIG. 8 is a block diagram, illustrating the main functional components of a core network node 800 in the wireless communication network described herein. The core network node 800 may be used to implement one or more of the core network functions, such as those shown in FIG. 1, 2, 4, 5 or 7 herein. Any of the core network functions may be implemented by a single core network node 800, or may be distributed among two or more core network nodes, each having the form of the node 800.

The core network node 800 comprises a communications module 810, including a network interface circuit to enable communications with other core network nodes and/or with base stations in the radio access network, as required.

The core network node 800 also comprises a data processing and control unit 820, which includes a processor 830 and a memory 840.

The processor 830 controls the operation of the core network node 800. The processor 830 may comprise one or more microprocessors, hardware, firmware, or a combination thereof.

The memory 840 may comprise both volatile and non-volatile memory for storing computer program code and data needed by the processor 830 for operation.

The memory 840 may comprise any tangible, non-transitory computer-readable storage medium for storing data including electronic, magnetic, optical, electromagnetic, or semiconductor data storage. The memory 840 stores at least one computer program comprising executable instructions that configure the processor 830 to implement the methods and procedures described herein. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, a computer program for configuring the processor 830 as herein described may be stored in a removable memory, such as a portable compact disc, portable digital video disc, or other removable media. The computer program may also be embodied in a carrier such as an electronic signal, optical signal, radio signal, or computer readable storage medium.

The invention claimed is:

1. A Policy Control Function (PCF) for use in a 5G core network, configured to: receive a request from a Session Management Function (SMF) for session management policies applying to a subscriber session in the 5G core network;
   retrieve policy data from a Unified Data Repository (UDR); wherein the PCF is configured to perform at least one of:
   (a) based on the retrieved policy data, generate said Application Detection and Control rules relating to the subscriber session, and send said Application Detection and Control rules to a Traffic Detection Function (TDF) or Traffic Detection Function User Plane (TDF-U), and
   (b) based on the retrieved policy data, generate Policy Charging and Control rules relating to the subscriber session and send said Policy Charging and Control rules to the SMF.

2. The PCF of claim 1, wherein the retrieved policy data indicates that a Traffic Detection Function User Plane (TDF-U) is required for the subscriber session.

3. The PCF of claim 2, further configured to receive from the UDR information identifying the TDF-U.

4. The PCF of claim 3, wherein the information identifying the TDF-U comprises an IP address of the TDF-U.

5. A Traffic Detection Function User Plane (TDF-U) for use with a 5G core network, configured to receive from a Session Management Function (SMF) subscriber session information and rules relating to a subscriber session in the 5G core network.

6. The TDF-U of claim 5, further configured to:
   create a subscriber session; and
   store subscriber session information and rules relating to said subscriber session.

7. The TDF-U of claim 6, further configured to:
   confirm to the SMF that the subscriber session has been created.

8. The TDF-U of claim 5, further configured to:
   detect traffic in said subscriber session, and to apply enforcement actions based on said rules relating to said subscriber session.

9. The TDF-U of claim 5, further configured to support an Event Exposure service.

10. A Session Management Function (SMF) for use in a 5G core network, configured to:

send a request for session management policies relating to a subscriber session in the 5G core network to a Policy Control Function (PCF);

receive from the PCF Policy Charging and Control rules relating to the subscriber session, wherein the Policy Charging and Control rules indicate that a Traffic Detection Function (TDF) or Traffic Detection Function User Plane (TDF-U) is required for the subscriber session.

11. The SMF of claim 10, further configured to select a TDF-U for the subscriber session, based on the received Policy Charging and Control rules.

12. The SMF of claim 11, further configured to select a User Plane Function (UPF) for the subscriber session, based on the received Policy Charging and Control rules.

13. The SMF of claim 11, further configured to:

send subscriber session information and rules to the selected TDF-U.

14. The SMF of claim 13, further configured to receive from the selected TDF-U confirmation that the subscriber session has been created.

15. A Unified Data Repository (UDR) for use in a 5G core network, wherein the UDR is configured to:

receive a query request from a Policy Control Function (PCF) relating to a subscriber session in the 5G core network;

determine whether a Traffic Detection Function User Plane (TDF-U) is required for the subscriber session; and if it is determined that a TDF-U is required for the subscriber session, indicate to the PCF that a TDF-U is required.

16. The UDR of claim 15, further configured to provide to the PCF information identifying the TDF-U.

17. The UDR of claim 16, wherein the information identifying the TDF-U comprises an IP address of the TDF-U.

* * * * *